United States Patent Office 2,934,572
Patented Apr. 26, 1960

2,934,572

THERMALLY STABLE FLUORO-OLEFIN TELO-MERS AND PROCESS OF PREPARING SAME

Donald R. Baer, Wilmington, Del., assignor to E. I. du Pont de Nemours and Company, Wilmington, Del., a corporation of Delaware No Drawing. Application August 15, 1958
Serial No. 755,123

7 Claims. (Cl. 260—648)

This invention is directed to thermally stable fluids and the process for preparing them. These novel compositions are co-telomers prepared by telomerizing selected perfluoroolefins and hydrocarbon olefins with a tertiary hydrocarbon telogen.

It is known to a telomerize a fluoroolefin, such as tetrafluoroethylene, with hydrocarbon olefins. For example, U.S. Patent 2,468,664 discloses that tetrafluoroethylene may be reacted with hydrocarbon olefins such as ethylene, propylene and the like in the presence of a hydrocarbon telogen which is used as a solvent for the reaction. The products of U.S. Patent 2,468,664, however, are solid materials and thus have no utility where liquids are required.

It is known from British Patent 583,874 that in telomerizing fluoroolefins or mixtures of fluoroolefins with other halogen containing olefins, mixtures of solid and liquid products are obtained by using a large excess of the telogen. Unfortunately, however, because mixtures of solid and liquid products are obtained, separation of the desirable liquid component is required. These copolymers also contain chlorine and this is extremely undesirable because it results in decreased stability at high temperatures; e.g., chlorine containing copolymers are reactive with metals, particularly copper, whereby corrosion at high temperatures occurs.

It is an object of the present invention to provide novel compositions which are liquid over an extremely wide temperature range, including both low and very high temperatures. It is a further object to provide compositions which are lubricants over a wide range of temperatures and which have improved properties with regard to viscosity index, volatility and lubricity. These novel compositions are also useful as hydraulic fluids and are of particular value in extreme temperature applications.

It is a further object of this invention to provide a process whereby these useful novel fluids are obtained in the absence of any solid products; this is of particular significance since this process provides greater yields of useful liquid materials and obviates the requirement for separating unwanted solid product.

It has now been found, unexpectedly, that by copolymerizing selected fluoroolefins and selected hydrocarbon olefins with a tertiary hydrocarbon telogen, the reaction being carried out with specific ratios of reactants, useful, thermally stable liquids are exclusively obtained; that is, no solid products are formed. The products obtained by the process of this invention have low volatility, are nonreactive, are thermally stable, and maintain their liquid properties over a wide range of temperature. In view of the fact that they contain a large proportion of non-fluorinated olefin units, it is surprising that these novel liquids are stable to very high temperatures.

More specifically the present invention is directed to a novel lubricant which is a telomer having an average molecular weight between about 800 and 1250 and which contains between about 3 and 10 units of the perfluoro-structure

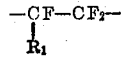

where $R_1$ is fluorine or a lower perfluoroalkyl group, and between about 5 and about 10 units of hydrocarbon structure

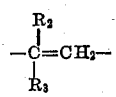

where $R_2$ and $R_3$ are hydrogen atoms or lower alkyl groups, with the proviso that the total number of the carbon atoms of the perfluoro unit and of the hydrocarbon unit is greater than 4, said telomer being terminated at one end by a hydrogen atom and terminated at the other end by the residue obtained by removing the hydrogen atom from the tertiary carbon atom of a tertiary hydrocarbon containing between 4 and 8 carbon atoms.

Further, the present invention is directed to a process of preparing liquids useful as lubricants, which consists of telomerizing at 50° C. to 160° C. and in the presence of a free radical initiator, a mixture of (1) 1 mole of a fluoroolefin of structure

where $R_1$ is a fluorine atom or a lower perfluoroalkyl group, (2) about 1 mole of a hydrocarbon olefin of structure

where $R_2$ and $R_3$ are hydrogen atoms or lower alkyl groups, the total number of the carbon atoms of the hydrocarbon olefin taken and the fluoroolefin taken exceeding 4, and (3) about 4 to 8 moles of a tertiary hydrocarbon telogen containing between 4 and 8 carbon atoms.

The process of this invention is carried out in a batch process by placing the tertiary hydrocarbon telogen and free radical initiator in the reaction vessel and then introducing gaseous fluoroolefin and hydrocarbon olefin and condensing or pressuring these gases in the cooled reaction vessel. When all the reactants are in the vessel, the temperature is raised to about a temperature between 50° C. and 160° C., preferably 130° C., and the reaction is allowed to proceed at autogenous pressure. The reaction can be followed by noting the drop in pressure that occurs with time. As the temperature in the reaction vessel is first increased to reaction temperature, the pressure within the system builds up; then as the reaction proceeds, this pressure drops. When the pressure remains steady it may be assumed that the reaction is completed. In a continuous process, the telogen and initiator are first charged to the reactor and then the fluoroolefin, hydrocarbon olefin and a mixture of telogen and initiator fed in as the product is continuously removed.

As indicated, the telogen used in this process is a tertiary hydrocarbon telogen containing between 4 and 8 carbon atoms. By tertiary hydrocarbon it is meant that one carbon atom of the compound has a single hydrogen atom attached to it, the other valences being completed by alkyl groups. Thus, telogens that are useful in this process include isobutane, 2-methylpentane, 2-methylhexane, 3-methylhexane, methylcyclopropane, methylcyclobutane, methylcyclopentane, methylcyclohexane and the like. The preferred telogens are methylcyclopentane and methylcyclohexane. The amount of tertiary hydrocarbon telogen should be between 2 and 4 moles per mole of combined olefins used (i.e., 4 to 8 moles of telogen per mole of fluoroolefin). By using this amount, the reaction will be controlled to yield products having the correct molecular weight range and correct ratio of monomer units. More than about 4 moles telogen per mole of total monomer will give lower molecular weight compounds and the volatility of the oil will then be lower than desirable. If much less than about 2 moles of telogen per mole of total olefins is used the molecular weight range of the product will be too high to exclude solid components in the reaction product.

The fluoroolefin used in the process of this invention will be of structure: $R_1CF=CF_2$, where $R_1$ is a fluorine atom or a lower perfluoroalkyl group. By lower alkyl group is meant an alkyl group containing from one to four carbon atoms. Thus, the perfluoroolefins that will be used in this process will include such members of the series as tetrafluoroethylene, hexafluoropropene, perfluorobutene-1, perfluoropentene-1, etc. The fluoroolefin must have the structure designated; that is, it must have terminal unsaturation. Perfluoroolefins not having terminal unsaturation will not readily polymerize with hydrocarbon olefins.

The hydrocarbon olefin used as a comonomer in preparing the product of this invention are those olefins which have the structure

where $R_2$ and $R_3$ are hydrogen atoms or lower alkyl groups. Thus, the hydrocarbon olefins which are useful in this process will include ethylene, propylene, butylene, isobutylene, the isomeric pentenes, etc. The amount of hydrocarbon olefin taken in this process should be about a molar equivalent to the amount of perfluoroolefin used. Excess of hydrocarbon olefin will give less stable fluorotelomer liquids.

A moderate amount of fluoroolefin over that specified will not adversely affect the reaction when fluoroolefins other than tetrafluoroethylene is used. With tetrafluoroethylene, however, the amount specified should not be exceeded because solid products may be formed.

In order that the process of this invention yield no solid products it is necessary that at least one of the olefins used contain at least three carbon atoms. Expressed another way, the sum of the carbon atoms of the olefin units taken must exceed four. To illustrate, telomerization of 1 mole ethylene (2 carbon atoms) and 1 mole tetrafluoroethylene (2 carbon atoms) with 6 moles of a tertiary hydrocarbon telogen gives mostly solid product. By using hexafluoropropylene (3 carbon atoms) instead of tetrafluoroethylene, an all liquid product is obtained. Alternately, tetrafluoroethylene may be used with propylene (instead of ethylene) to obtain an all liquid product.

As indicated the reaction is carried out in the presence of a free radical initiator and at temperatures between about 50° C. and 160° C. The relationship between temperature and initiator is such that an initiator must be used which will decompose to give free radicals at the temperature at which the reaction is to be carried out. Conversely, if an initiator is used which is known to decompose to free radicals at low temperatures, then, of course, higher temperatures are not required. For example, temperatures as low as about 30° C. may be employed with an initiator such as heptafluorobutyryl peroxide, which compound readily yields free radicals at such temperature. Normally, however, an initiator having a half-life of about 3 hours at temperatures between 50° and 160° C. will be used. These include ditertiary-butyl peroxide, diethyl peroxide, dipropyl peroxide, t-butyl-hydroperoxide, and the like. Other free radical generating catalyst may also be used as for example $\alpha,\alpha'$-azodiisobutyronitrile. Preferably di-t-butyl peroxide will be used. Generally the amount of initiator used will be between .01 and about 5% by weight based on the weight of the telogen and preferably between about 0.8% and about 5% will be used. The reaction is preferably carried out under autogenous pressure conditions and these will be generally on the order of 100 to 2000 lbs. per sq. in. gauge (p.s.i.g.) dependent upon the sum of the partial pressure of reagents at the temperature employed. Externally induced pressures up to 10,000 p.s.i.g. can be used, but generally without significant improvement. It will be understood that in some systems, the reaction will not occur below a certain pressure and these cases, the minimum pressure required is easily determined by experiment. For example, it is readily found that in the isobutane-tetrafluoroethylene-butene-1 system, a minimum pressure of about 500 p.s.i.g. is required.

The products of the present invention are liquids and are extremely useful as lubricants and hydraulic fluids useful over a range of temperature extremes. The compositions of this invention maintain their liquid state at temperatures between about $-5°$ C. to above 400° C. In some cases, this range is actually exceeded, particularly in the low end. These liquids have an average molecular weight between about 800 and 1250 and structurally they are composed of fluoroolefin units, hydrocarbon olefin units and are terminated at one end by hydrogen and at the other end by the residue obtained by removing a hydrogen atom from the tertiary carbon atom of a tertiary hydrocarbon containing between 4 and 8 carbon atoms. The fluoroolefin unit composing a portion of the telomer chain of these compounds may be designated as

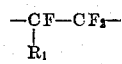

where $R_1$ is a fluorine or a lower perfluoro alkyl group. These liquid compositions will contain between 3 and about 10 of such perfluoroolefin units. The hydrocarbon portion of the compound will consist of units

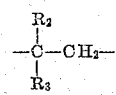

where $R_2$ and $R_3$ are hydrogen atoms or lower alkyl groups. There will be between about 5 and 10 of such olefin units in the polymer. Unless the compositions have both the molecular weight range specified and the number of olefin units and hydrocarbon units specified, the products will either not be liquids or will not have the properties (i.e., stability at high temperature) desired. The preferred compositions of this invention will have about equal amounts of the perfluoroolefin and hydrocarbon olefin units within the telomer chain. The preferred compositions will have a molecular weight of about 1000.

The compositions of this invention have many valuable properties which make them useful in many applications. For example, these compositions have a density lower than the comparative products available heretofore and this property makes the subject compositions superior as hydraulic fluids and lubricants in aircraft where excess weight must be avoided. The viscosity index (i.e., change in viscosity with temperature) of the novel compositions is excellent and superior to the viscosity index of previously known fluoro oils. The fluoro oils available heretofore exhibit a negative viscosity index which reflects a large change in viscosity with temperature. The novel compositions have positive values of viscosity index indicating a significant improvement. In addition, the volatility of these novel oils is very low compared to previously known fluoro oils. This property is of extreme importance where these compounds are used at elevated temperatures since loss by vaporization must not occur.

In view of the excellent lubricity properties of the novel compounds of this invention they may be used as general lubricants and are of particular value in the textile industry. In textile machines where fibers are guided along metal or wooden spindles at high speeds, high temperatures are generated which often cause breakdown of conventional lubricants. Because of their thermal stability, excellent lubricity, low volatility and non-corrosive nature, the compositions of this invention serve admirably as lubricants for textile applications. Other uses for these novel compositions are as plasticizers and snuffer agents (i.e., to increase flash points of flammable solvents).

Representative examples illustrating the present invention are as follows.

EXAMPLE 1

A stainless steel reaction vessel was charged with two parts (0.014 mole) of di-tert-butyl peroxide catalyst and then the vessel was cooled in a Dry Ice acetone bath to about —70° C. The reaction vessel was evacuated and 163 parts (1.9 moles) of methylcyclopentane, 50 parts (0.5 mole) of tetrafluoroethylene and 21 parts (0.5 mole) of propylene were pressured into the system. The vessel was then closed off and heated to 130° C. with agitation. During 10 hrs. the pressure dropped from 510 p.s.i.g. to 75 p.s.i.g. The reaction vessel was then cooled, unreacted gases were vented and 236 parts of a thin liquid was removed. Unreached methylcyclopentane was removed by evaporating it from the reaction product heated gradually to 150° C. and 1 mm. pressure. The residue of 73 parts was a heavy yellow oil. After treatment of the oil with activated charcoal at 130° C. for one hour and filtration, 64 parts of a straw colored liquid was obtained having a pour point of —5° C. and a boiling point above 400° C.

This heavy oil has an average molecular weight of 810 and contains 43.0% by weight fluorine, 50.3% carbon and 5.9% hydrogen. The average composition of the telomer consists of one methylcyclopentane residue, 4.6 tetrafluoroethylene units and 6.0 propylene units.

This co-telomer shows good oxidation stability at high temperatures. When air is passed through the oil for 16 hours at 250° C. in a stainless steel cell, containing copper strips, the oil darkens, but shows no evidence of coke or sludge formation.

EXAMPLE 2

In the manner described in Example 1 the reaction vessel was charged with 168 parts (2.0 moles) of methylcyclopentane, 50 parts (0.5 mole) of tetrafluoroethylene, 28 parts (0.5 mole) of butene-1 and 2 parts (0.014 mole) di-tert-butyl peroxide. The reaction vessel was heated with shaking at 130° C. for 8 hours during which time the pressure dropped from 500 to 175 p.s.i.g. A product of 228 parts was removed as a thin oil, which, after removing the solvent by distilling to a pot temperature of 150° C. at 1 mm. gave 63.3 parts of a yellow oil. This oil was purified by decolorizing with "Darco" activated charcoal and filtering at 130° C. A pale yellow oil amounting to 55.5 parts was recovered. It has a pour point of —5° C. and an extrapolated boiling point above 400° C.

This oil has an average molecular weight of 944 and analyzes for 46.9% carbon, 47.6% fluorine and 5.3% hydrogen. The average composition thus consists of one methylcyclopentane residue, 5.6 tetrafluoroethylene units and 4.9 butene-1 units.

Oxidation with air bubbling through this oil for 16 hours at 250° C. and in the presence of copper as in Example 1, turns the oil red-brown in color, but no coke or sludge is formed; 96% of the oil is recovered.

EXAMPLE 3

*Methylcyclohexane-tetrafluoroethylene-propylene.— Continuous telomerization*

A 1400 ml. stainless steel agitated autoclave was filled with methylcyclohexane containing 1% di-tert-butyl peroxide and heated to 130–140° C. at 450 p.s.i.g. pressure. Gaseous tetrafluoroethylene (3 moles/hr.) and propylene (3 moles/hr.) were compressed and fed into the autoclave. At the same time methylcyclohexane (13 moles/hr.) containing 1% di-tert-butyl peroxide was fed into the reactor. The pressure was maintained at 450 p.s.i.g. by a gradual release of product as it was formed. Steady state conditions were reached at about 2.5 hours. After 4.5 hours 7304 g. of product was collected, the excess telogen removed and the residue topped to give 579 g. of a pale yellow oil having an average molecular weight of 1046. Analysis indicated a ratio of 6.9 propylene units and 6.7 tetrafluoroethylene units for each unit of methylcyclohexane.

EXAMPLE 4

Using the procedure of Example 1, the pressure vessel was charged with 116 parts (2.0 mole) of isobutane, 150 parts (1.0 mole) of hexafluoropropylene, 56 parts (1.0 mole) of isobutylene, and 2 parts (0.017 mole) of di-tert-butyl peroxide. After heating to 130° C., the pressure dropped from 4950 to 2600 p.s.i.g. in 9 hours. The product consisting of 69 parts was isolated as a heavy oil having an average molecular weight of 997. Analysis of the oil shows 47.2% carbon and 49.1% fluorine, corresponding to one isobutane residue, 4.3 hexafluoropropylene units and 5.5 isobutylene units.

EXAMPLE 5

Using the procedure described in Example 1, 116 parts of isobutane (2.0 moles); 150 parts of hexafluoropropylene (1.0 mole); 28 parts of ethylene (1.0 mole) and 2 parts of di-tert-butyl peroxide (0.014 mole) were charged into a pressure vessel. When heated to 130° C. the pressure rose to a maximum of 5500 p.s.i.g., dropping to 800 p.s.i.g. after 11 hours. After cooling and degassing the product, 143 parts was removed as a colorless oil of the consistency of mineral oil. The product was distilled to give the following cuts:

| Cut | B.P., ° C. | Parts by Weight |
| --- | --- | --- |
| I | 113–134/atm | 3.3 |
| II | 65/1.5–100/0.4 mm. Hg | 13.3 |
| Residue (clear colorless oil) |  | 102.9 |

Analysis of the residual oil indicated an average molecular weight of 1095, 53.3% fluorine, 41.6% carbon and 4.2% hydrogen. This corresponds to a structure containing one isobutane residue, 5.2 hexafluoropropylene units and 9 ethylene units. The pour point of this oil was —15° C.

EXAMPLE 6

A comparison of the properties of the compounds of this invention with other fluorine containing lubricants is given in the following table. The tests for volatility and lubricity used to evaluate these properties are as follows:

TEST FOR VOLATILITY

The telomer oils of this invention show excellent volatility characteristics; i.e., on continued use at high temperatures, the oils do not evaporate significantly.

TEST PROCEDURE—TWO HOUR 400° F. EVAPORATION TEST

Determination of the volatility of fluids for high temperature applications.

*Apparatus.*—Aluminum foil, hot plate and Variac, 3" x 6" copper plate with attached thermocouple, temperature indicator.

*Procedure.*—Small flat dishes 1½" in diameter by ⅜" deep are fashioned from the aluminum foil using a suitable form. These dishes are weighed to 0.1 mg., then about 1 gm. of the oil sample is placed therein and reweighed to 0.1 mg.

The dishes containing the samples are then placed on the hot copper plate regulated to 400° F. by means of the Variac controlled hot plate and allowed to remain for two hours.

This test is best carried out in a well-ventilated hood to remove any noxious or toxic fumes and to provide a circulating atmosphere above the sample surface. At the end of the two-hour test period the samples are removed and the dishes reweighed as before:

*Results.*—The sample weight loss is determined and is reported as percent evaporation.

TEST FOR LUBRICITY CHARACTERISTICS

The excellent lubricity of the compounds of this invention is shown by means of the following test:

TEST PROCEDURE.—LOAD CARRYING ABILITY—FALEX TEST

[Ref.: E. G. Ellis, "Lubricant Testing"; 1953, page 153.]

The "rapid Falex test" is used to indicate the load carrying ability of candidate stable lubricants. Essentially the test involves the failure of an oil to carry a load as evidenced by the seizure of the test pin and bushings or a sudden increase in torque reading.

*Apparatus.*—Falex test machine, test bushings and pins.

*Procedure.*—After proper insertion of the test pieces, the sample reservoir is filled with about 50 ml. of the fluid to be tested and placed in position such that the fluid completely covers the test pieces. The Jaw-Load is adjusted to 250 pounds and the torque gauge linkage adjusted to 0. The machine is started and following a 3-minute run-in period during which time the load is maintained constant, the automatic loading device is engaged. The load at which the torque reading shows a sudden increase and/or seizure occurs is recorded as the maximum load held.

*Results.*—For best interpretation, the test should be compared to a "standard sample" run in the same way and whose behavior is known in prototype equipment. The standard used in evaluating the compounds of this invention was Esso Turbo Oil No. 15 which is used to lubricate jet engines. Esso Turbo Oil No. 15 shows a maximum jaw load of 1530 lbs. and a maximum bushing temperature of 285° F.

COMPARATIVE PROPERTIES OF FLUORINE CONTAINING LUBRICANTS

|  | A | B | C | D |
|---|---|---|---|---|
| Viscosity Index (ASTM-D-567). | 69 | 66 | −9 | −125 |
| Volatility—Percent Evaporated. | 14.2 | 15.0 | 64.7 | >62 |
| Lubricity: | | | | |
| Maximum Jaw Load (Lbs.). | >4,500 | >4,500 | Failed at 2,500 to 3,300 lbs. | 4,500 |
| Torque at Failure (Lb.-in.). | 68–70 | 58–60 |  | 79 |
| Max. Bushing Temp. (° F.). | 450 | 430–460 |  | 510 |
| Relative Wear | Moderate | Moderate |  | High |
| Density | 1.35 | 1.35 | 1.5 | 1.93 |

In this comparison table, A is the telomer of Example 3; B is the telomer of Example 1; C is a telomer of tetrafluorethylene, vinylidene fluoride with an isobutane telogen; and D is the "Kel-F" fluorocarbon oil $$(Cl(CF_2-CFCl)_x-Cl)$$

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A lubricant consisting essentially of a telomer having an average molecular weight between about 800 and 1250 and which contains between about 3 and 10 units of the perfluoro-structure $$-\underset{\underset{R_1}{|}}{CF}-CF_2-$$

wherein $R_1$ is taken from the group consisting of fluorine and lower perfluoroalkyl, and between about 5 and about 10 units of the hydrocarbon structure $$-\underset{\underset{R_3}{|}}{\overset{\overset{R_2}{|}}{C}}-CH_2-$$

wherein $R_2$ and $R_3$ are taken from the group consisting of hydrogen and a lower alkyl group, the total number of carbon atoms of the perfluoro unit and of the hydrocarbon unit being greater than 4, said telomer being terminated at one end by a hydrogen atom and terminated at the other end by the residue obtained by removing the hydrogen atom from the tertiary carbon atom of a tertiary hydrocarbon containing between 4 and 8 carbon atoms.

2. A process of preparing a lubricant which consists of telomerizing at 50° C. to 160° C., in the presence of a free radical initiator, a mixture of (1) 1 mole of a fluoroolefin of structure $$\underset{\underset{R_1}{|}}{CF}=CF_2$$

where $R_1$ is taken from the group consisting of fluorine and a lower perfluoroalkyl group, (2) about 1 mole of a hydrocarbon olefin having the structure $$\underset{\underset{R_3}{|}}{\overset{\overset{R_2}{|}}{C}}=CH_2$$

where $R_2$ and $R_3$ are taken from the group consisting of hydrogen and a lower alkyl group, the total number of carbon atoms of said hydrocarbon olefin and said fluoroolefin exceeding 4, and (3) about 4 to 8 moles of a tertiary hydrocarbon telogen containing between 4 and 8 carbon atoms.

3. A process of preparing a lubricant which consists of telomerizing at 50° C. to 160° C., in the presence of a free radical initiator, a mixture of (1) about 0.5 mole of tetrafluoroethylene, (2) about 0.5 mole of propylene, and, (3) about 1.9 moles of methylcyclopentane.

4. A process of preparing a lubricant which consists of telomerizing at 50° C. to 160° C., in the presence of a free radical initiator, a mixture of (1) about 0.5 mole of tetrafluoroethylene, (2) about 0.5 mole of butene-1, and, (3) about 2.0 moles of methylcyclopentane.

5. A process of preparing a lubricant which consists of telomerizing at 50° C. to 160° C., in the presence of a free radical initiator, a mixture of (1) about 1.0 mole of hexafluoropropylene, (2) about 1.0 mole of isobutylene, and, (3) about 2.0 moles of isobutane.

6. A process of preparing a lubricant which consists of telomerizing at 50° C. at 160° C., in the presence of a free radical initiator, a mixture of (1) about 1.0 mole of hexafluoropropylene, (2) about 1.0 mole of ethylene, and, (3) about 2.0 moles of isobutane.

7. A continuous process of preparing a lubricant by feeding gaseous tetrafluoroethylene and gaseous propylene, together with methylcyclohexane containing a free radical initiator into a reactor containing methylcyclohexane and a free radical initiator, said reactor being maintained at 50° C. to 160° C., and, recovering the product telomer from said reactor as it is formed.

References Cited in the file of this patent

UNITED STATES PATENTS

| 2,440,800 | Hanford et al. | May 4, 1948 |
| 2,856,440 | Wolff | Oct. 14, 1958 |